United States Patent
Chen et al.

(10) Patent No.: US 11,947,745 B2
(45) Date of Patent: Apr. 2, 2024

(54) HANDWRITING DATA PROCESSING METHOD AND HANDWRITING DATA PROCESSING SYSTEM

(71) Applicant: USI ELECTRONICS (SHENZHEN) CO., LTD., Shenzhen (CN)

(72) Inventors: Chih-Hsiang Chen, Shenzhen (CN); Chi-Hua Shih, Shenzhen (CN); Huang-Chu Liu, Shenzhen (CN); Jan-Yi Hsiao, Shenzhen (CN)

(73) Assignee: USI ELECTRONICS (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 18/170,337

(22) Filed: Feb. 16, 2023

(65) Prior Publication Data
US 2024/0053834 A1 Feb. 15, 2024

(30) Foreign Application Priority Data

Aug. 11, 2022 (CN) .......................... 202210960930.6

(51) Int. Cl.
*G06F 3/0354* (2013.01)
(52) U.S. Cl.
CPC ................ *G06F 3/03545* (2013.01)
(58) Field of Classification Search
CPC ............. G06F 3/03545; G06F 3/04883; G06F 3/041–046
See application file for complete search history.

(56) References Cited

U.S. PATENT DOCUMENTS

2012/0162444 A1* 6/2012 Suda ................... G06F 3/03545
348/207.1
2018/0341385 A1* 11/2018 Kato ..................... G06F 3/0488

* cited by examiner

*Primary Examiner* — Temesghen Ghebretinsae
*Assistant Examiner* — Ivelisse Martinez Quiles
(74) *Attorney, Agent, or Firm* — Muncy, Geissler, Olds & Lowe, P.C.

(57) ABSTRACT

A handwriting data processing method is applied to a pen display having wireless communication function and a data processing device. The handwriting data processing method includes the steps of: the data processing device obtaining a handwriting data from the pen display in a wireless communication manner; the data processing device generating a compressed screen image and transmitting the data of the compressed screen image and the handwriting data, which is not compressed, to the pen display in the wireless communication manner; the pen display uncompressing the data of the compressed screen image and overlapping the uncompressed screen image and the handwriting data to form a complete screen image and displaying the complete screen image. By the handwriting processing method, the machine time of the processor of the pen display is effectively lowered, significantly reducing the delay phenomenon of the displayed handwriting.

6 Claims, 3 Drawing Sheets

HANDWRITING DATA PROCESSING METHOD AND HANDWRITING DATA PROCESSING SYSTEM

BACKGROUND OF THE INVENTION

1. Field of the Invention

The present invention relates to a data processing method for a pen display, and more particularly to a data processing method for a pen display capable of wireless communication, effectively solving the problem of delay of handwriting on the pen display.

2. Description of the Related Art

Conventional graphics drawing tablet is void of display function. In ordinary situation, the graphics drawing tablet is connected with a computer by solid electric wires, so that a user needs to hold a touch pen (a.k.a. stylus) to draw or write on the graphics drawing tablet and watch the user's graphic drawing or handwriting on a monitor of the computer.

In order to enhance the experience of computer graphics drawing and the convenience in use, it is known that some companies have developed the product of pen display, which combines the functions of graphics drawing tablet and display, enabling the user to watch the pen display while drawing, closer to real conventional pen writing or pen drawing experience. Furthermore, to facilitate the convenience in use, some pen display adapts wireless communication technology (e.g., Wi-Fi) to do data communication with the computer.

Specifically, known pen display equipped with wireless communication function utilizes wireless communication technology to receive screen images of a data input end (a.k.a. source end) and further displays the received screen images on a monitor of the pen display. The Source end is an active controlling device, which may be a computer equipped with fundamental processing function, a notebook or a smart phone, etc. that can transmit the screen images via wireless communication technology. Compared to that, pen display belongs to a signal output end (a.k.a. sink end), which is a passive device. In ordinary situation, pen display is equipped with fundamental embedded operating system or microprocessor, which can be boot up independently and communicated with the source end via network communication. Sink end belongs to a controlled end. Sink end receives the screen images transmitted from the source end via wireless communication technology and displays the screen images.

When the pen display is activated, it activates the function of wireless network searching to search the source end device and further connects the source end device. Once completing the network connection, the user can draw or write on the pen display via stylus.

When the user draws or writes on the pen display, the pen display will transmit the data of the handwriting of the stylus to the source end by wireless communication technology. The aforementioned handwriting data includes the data of the two-dimensional X-Y coordinate data, etc. so that the monitor of the source end (e.g., the monitor of the notebook) can show the trajectory of the aforementioned handwriting. After that, the source end will overlap its screen image with the aforementioned two-dimensional X-Y coordinate data to form a "complete screen image", compress the complete screen image, and further transmit the compressed complete screen image to the sink end by network packages. After the sink end receives the aforementioned network packages, the sink end will do the uncompressing and display the uncompressed "complete screen image" on the monitor of the pen display.

However, the bandwidth of wireless communication is usually low. In ordinary situation, the data size of the network packages of the "complete screen image" is quite large, which results in long data transmitting time. It also increases the required processing time of the sink end. Therefore, it will cause delay phenomenon between the user's handwriting movement and the finally displayed handwriting on the monitor of the pen display, worsening the experience of using the pen display.

SUMMARY OF THE INVENTION

It is an objective of the present invention to obviate or at least alleviate the drawbacks of the conventional arts to provide a handwriting data processing method and a handwriting data processing system, which can effectively reduce the delay phenomenon of the displayed handwriting and enhance the user's handwriting experience.

To attain the objective above, according to a handwriting data process method the present invention, which is applied to a pen display and a data processing device, the pen display is wirelessly connected with the data processing device, the handwriting data processing method comprises the steps of: the data processing device obtaining a handwriting data from the pen display in a wireless communication manner; the data processing device generating a compressed screen image and wirelessly transmitting the compressed screen image data and the handwriting data, which is received and not compressed from the pen display, to the pen display; the pen display uncompressing the compressed screen image, the pen display overlapping the uncompressed screen image and the received handwriting data to form a complete screen image and displaying the complete screen image.

Through the above-described handwriting data processing method, the data processing device transmits the compressed screen image and the handwriting data which is not compressed to the pen display respectively. The compressed screen image is the only data that the pen display has to compress. The data size of the handwriting data is usually small, therefore effectively lowering the machine time of the processor of the pen display and facilitating quickly displaying the user's handwriting data. The method also effectively enhances the display refresh rate of the handwriting data, effectively lowering the delay phenomenon of the displayed handwriting and optimizing the user's handwriting experience.

In one aspect, the data processing device may be a computer, a notebook or a smartphone. It should not be limited to the present invention.

In another aspect, based on the reason that the data size of the handwriting data is usually small and the handwriting data is not compressed in the present invention, the times of the handwriting data transmitted to the pen display per second by the data processing device is therefore enhanced. The times of the handwriting data transmitted to the pen display per second by the data processing device can be rendered to be higher than the times of the compressed screen image transmitted to the pen display per second by the data processing device, therefore the display refresh rate of the handwriting data is enhanced and the delay phenomenon of the displayed handwriting is further effectively reduced.

The present invention further provides a handwriting processing system, which comprises a pen display and a data processing device. The pen display comprises a display module, a transducer, a first wireless communication module and a first processing module being electrically connected with the display module, the transducer and the first wireless communication module. The transducer detects and further generates a handwriting data. The data processing device comprises a second processing module and a second wireless communication module being electrically connected with the second processing module. The second wireless communication module is wirelessly coupled to the first wireless communication module, wherein the data processing device obtains the handwriting data by the second wireless communication module. After the data processing device receives the handwriting data, the data processing device generates a compressed screen image and transmits the compressed screen image and the handwriting data which is not compressed to the pen display by the second wireless communication module. The first processing module uncompresses the compressed screen image and overlaps the uncompressed screen image and the handwriting data which is not compressed to form a complete screen image. The display module displays the complete screen image.

In another aspect, the handwriting data processing system further comprises a stylus. When the stylus contacts the display module of the pen display, the transducer detects the contact position and the contact pressure and therefore generates the handwriting data.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

For the detailed description of the technical features of the present invention, an illustrative embodiment and accompanying drawings are given herein below.

Figure 1:
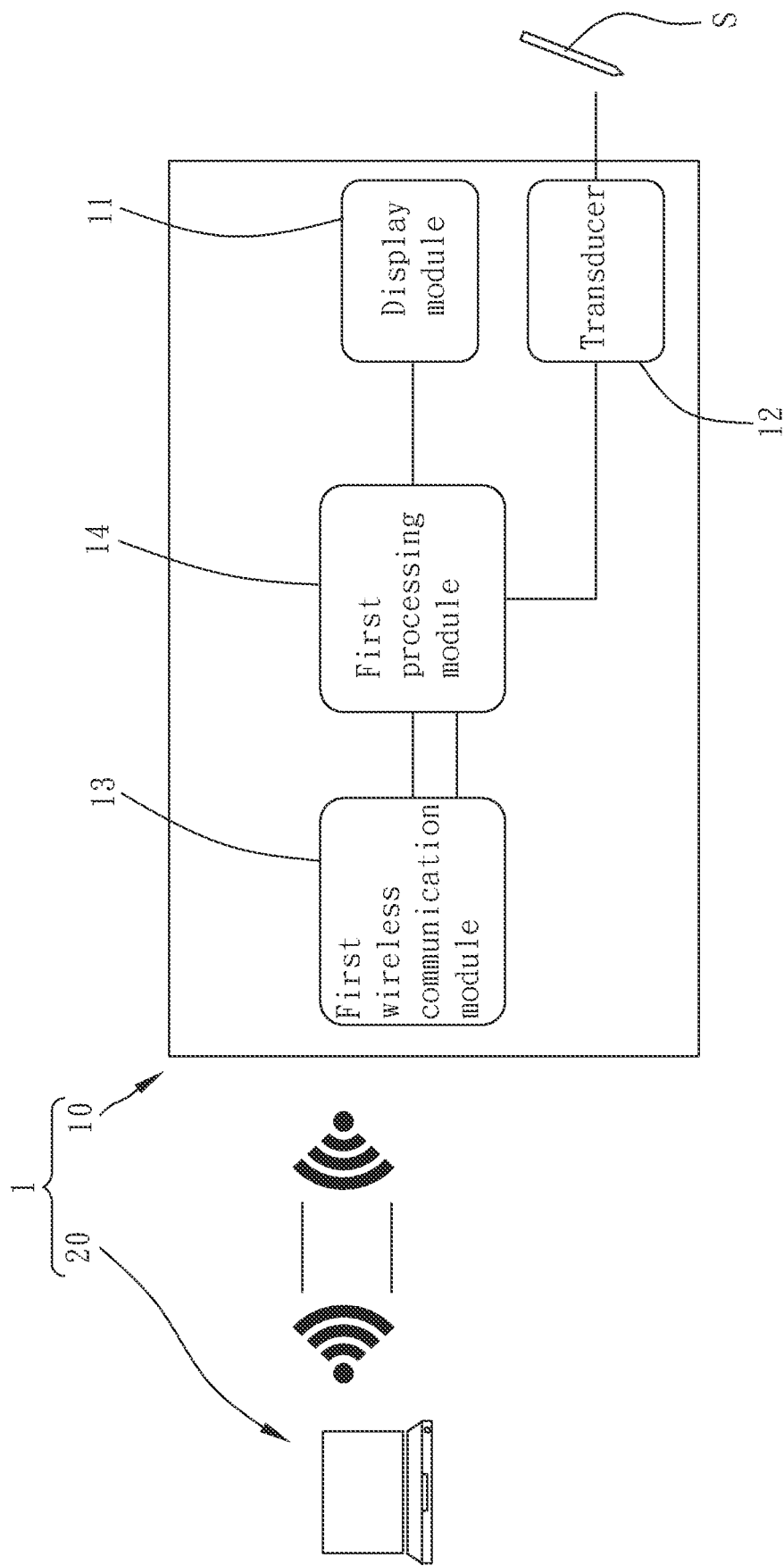
FIG. 1 is a schematic diagram of a handwriting data processing system of an embodiment of the present invention.

As shown in FIG. 1, a handwriting data processing system 1 of an embodiment of the present invention is provided to comprises a pen display 10 and a data processing device 20.

The pen display 10 is used for a signal output end (sink end), which is equipped with an independent operation system and wireless network connecting function. The pen display 10 comprises a display module 11, a transducer 12, a first wireless communication module 13 and a first processing module 14. The display module 11 is an LCD panel, which is used for displaying images, videos or handwritings. In the present embodiment, the transducer 12 is an EMR transducer (Electro Magnetic Transducer). The transducer 12 may be used with a stylus S. When a user holds the stylus S to contact and move on the display module 11 of the pen display 10, the stylus S will generate an electromagnetic signal on the display module 11. The EMR transducer detects and further analyzes the aforementioned electromagnetic signal and therefore generates a handwriting data. The handwriting data comprises but not limited to a two-dimensional X-Y coordinate position, contact pressure value, and tilt angle . . . etc. The transducer 12 then transmits the handwriting data to the first processing module 14. It is deserved mentioning that the EMR transducer is used only for an example, but other kinds of transducer can be used, e.g., capacitive transducer or resistive transducer used in traditional touch screen, therefore it should not be limited to the present embodiment.

The first wireless communication module 13 is a Wi-Fi module in the present embodiment, which is capable of connecting the data processing device 20 by wireless network communication. The first processing module 14 is a microcontroller (MCU) or applies a system on a chip (SoC) framework. The first processing module 14 is electrically connected with the display module 11, the transducer 12, and the first wireless communication module 13. The first processing module 14 receives the aforementioned handwriting data and transmits the handwriting data to the data processing device 20 via the first wireless communication module 13. The first processing module 14 further processes other data, which will be described in the following paragraphs.

Figure 2:
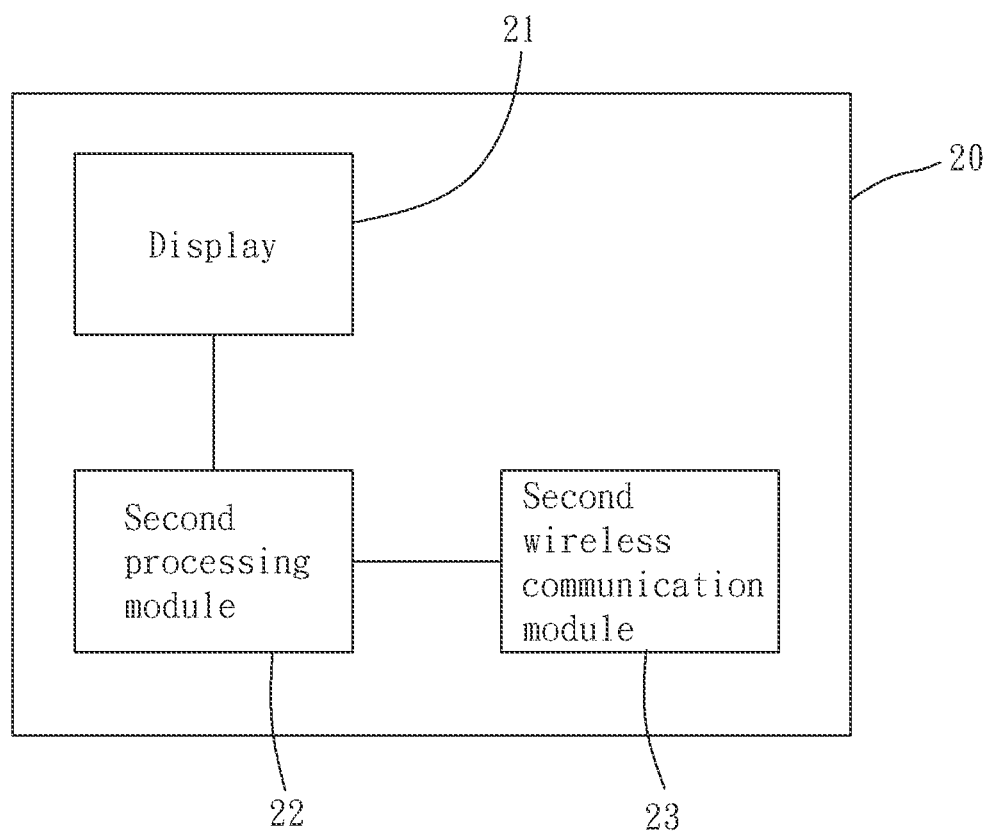
FIG. 2 is a schematic diagram of a data processing device of the embodiment of the present invention.
Figure 3:
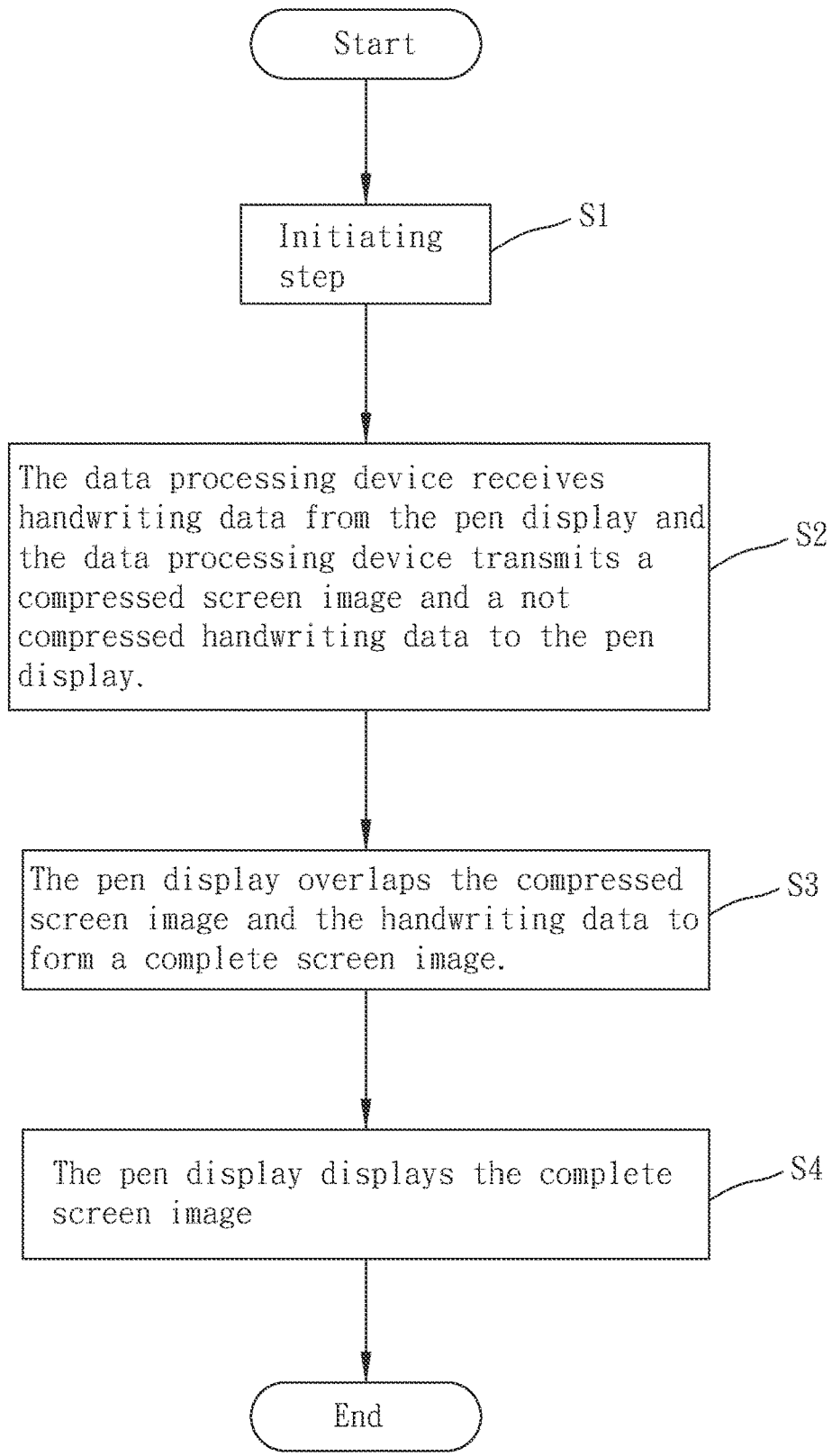
FIG. 3 is a flow chart of a handwriting data processing method of the embodiment of the present invention.

Please take reference to FIG. 2, the data processing device 20 belongs to a signal input end (Source end). In the present embodiment, the data processing device 20 is a computer, which is equipped with ordinary processing function. The data processing device 20 comprises a display 21, a second processing module 22, a second wireless communication module 23 and other components such as memory and power that are commonly used for maintaining the ordinary function of the data processing device 20. The second processing module 22 is electrically connected with the display 21 and the second wireless communication module 23. The display 21 is used for displaying images, videos and handwriting. The second wireless communication module 23 is a Wi-Fi module in the present embodiment, which is capable of connecting the first wireless communication module 13 by wireless network communication. The second processing module 22 is the CPU of a computer in the present embodiment.

The operation method of the handwriting processing system 1 of the present embodiment is described as follows. First off, when booting up the pen display 10 and the data processing device 20, the pen display 10 will initiate the wireless network connecting function to search the data processing device 20 and connect the data processing device 20 via wireless network communication, so that the two devices can transmit data to each other. When the user holds the stylus S and draws or writes on the display module 11 of the pen display 10, the stylus S will generate an electromagnetic signal on the display module 11. The transducer 12 analyzes the aforementioned electromagnetic signal and transforms it to a handwriting data, and then transmits the handwriting data to the first processing module 14. After the first processing module 14 receives the handwriting data, the first processing module 14 transmits the aforementioned handwriting data to the data processing device 20 by the first wireless communication module 13 via wireless communication technology.

After the data processing device 20 receives the aforementioned handwriting data, the second processing module 22 of the data processing device 20 will executes an image capturing and transmitting program to capture a small range of the received handwriting image of the handwriting data and further re-transmit the captured handwriting data to the pen display 10 in a not uncompressed manner. Besides, the second processing module 22 of the data processing device 20 will also executes an application program to capture a screen image of the display 21 of the data processing device 20 and compress the captured screen image and further transmit the network package of the compressed and captured screen image to the pen display 10. After the pen display 10 receives the aforementioned compressed screen image and the not compressed and captured handwriting data, the first processing module 14 will uncompress the aforementioned compressed screen image and further overlap the aforementioned uncompressed screen image and the not compressed and captured handwriting data to form a complete screen image, and transmit the aforementioned complete screen image to the display module 11 to display via a video signal conversion scaler finally. It is deserved mentioning that, in certain situation, the chip performing the function of the aforementioned video signal conversion scaler may be built-in in the first processing module 14, therefore it should not be limited to the present embodiment.

Compared to the traditional way to process the handwriting data, in the present embodiment, the data processing device 20 transmits the compressed screen image and the not compressed handwriting data to the pen display 10 respectively, the compressed screen image is the only data required being uncompressed by the pen display 10. Based on the reason that the data size of the handwriting data is usually small, effectively lowering the machine time of the processing module 14 of the pen display 10 and rendering much more quickly displaying the handwriting data drawn by the user. Therefore, when the user completes the physical handwriting, the handwriting displayed by the display module 11 of the pen display 10 is almost followed and completed. The dragging phenomenon of the handwriting would be less likely happened, effectually enhancing the refresh rate of the handwriting data and optimizing user's writing experience.

Due to the large data size of the handwriting data that are required being processed by traditional pen display which utilizes wireless communication technology, the problem of overlong transmitting time would be likely caused. In ordinary situation, the delay time for traditional pen display would be more than 500 mini second (500 ms). By the design of the handwriting data processing system 10 of the present embodiment, by the inventor's practical test result, the delay time of the pen display 10 of the present embodiment can be significantly reduced to 35 mini second (35 ms), so that the user would be difficult to perceive the delay phenomenon of the handwriting displayed by the pen display 10.

The present embodiment further provides a handwriting data processing method. Its specific steps are described as follows.

Step S1: initiating step: booting up the pen display 10 and the data processing device 20. At this time, the data processing device 20 will initiate the wireless network connecting function to search the pen display 10. The pen display 10 will also initiate the wireless network connecting function to search the data processing device 20. After that, the data processing device 20 and the pen display 10 will both establish network communication, so that both of them can transmit data to each other.

Step S2: The data processing device 20 executes an application program to capture and compress a screen image of the display 21. When the user holds the stylus S to write or draw on the display module 11 of the pen display 10, the stylus S will generate an electromagnetic signal on the display module 11 and the transducer 12 will then analyze and transform the aforementioned electromagnetic signal to a handwriting data. The handwriting data comprises two-dimensional coordinate position, contact pressure value, and tilt angle . . . etc. The first processing module 14 analyzes the handwriting data and transform the analyzed handwriting data to a data format that can be transmit by wireless communication technology and further transmit the transformed handwriting data to the data processing device 20. After the data processing device 20 receives the transformed handwriting data from the pen display 10, the data processing device 20 executes an image capturing and transmitting program to capture a part of the received handwriting image of the handwriting data. The data processing device 20 further re-transmits the aforementioned compressed screen image and the captured and not compressed handwriting data to the pen display 10 by wireless communication technology.

Step S3: After the first processing module 14 of the pen display 10 receives the handwriting data and the data of the compressed screen image, the first processing module 14 firstly checks the correctness of the handwriting data, for example, the correctness of the positions of the handwriting and the correctness of the handwriting data, to make sure that the incorrect handwriting data will not be displayed on the pen display 10 due to the incorrect handwriting data. After the first processing module 14 makes sure that the handwriting data is correct, the first processing module 14 uncompresses the aforementioned compressed screen image and overlaps the aforementioned compressed screen image and the captured handwriting data to form a complete screen image.

Step S4: The first processing module 14 transmits the aforementioned complete screen image to the display module 11 to display.

It is deserved mentioning that, due to the small data size of the handwriting data, in the step S2, the times of the handwriting data transmitted to the pen display 10 per second by the data processing device 20 can be further increased, so that the times of the handwriting data transmitted to the pen display 10 per second will be larger than the times of the aforementioned compressed screen image transmitted to the pen display 10 per second. Therefore, the refresh rate of the handwriting data is further effectively increased. The handwriting data displayed on the pen display 10 can almost and exactly follow the user's physical handwriting.

The above-exemplified method and the article of the embodiment is given for clarifying the practically embodied configuration of the preferred embodiment of the present invention. The present invention is not limited to the above-exemplified embodiment. The modifications and variations within the spirit and scope disclosed in the present invention should be still included within the scope of the present invention.

What is claimed is:

1. A handwriting data processing method, which is applied to a pen display and a data processing device, the pen display being connected with the data processing device in a wireless communication manner, the handwriting data processing method comprise steps of:

the data processing device obtaining a transformed handwriting data from the pen display in the wireless communication manner; the data processing device generating a compressed screen image and capturing a small range of a handwriting image of the transformed handwriting data to form a captured handwriting data; the data processing device further wirelessly transmitting the compressed screen image and the captured handwriting data, which is received and not compressed, to the pen display;

the pen display uncompressing the compressed screen image, the pen display overlapping the uncompressed screen image and the captured handwriting data which is not compressed to form a complete screen image and displaying the complete screen image.

2. The handwriting data processing method as claimed in claim 1, further comprising a step of increasing times of the compressed screen image transmitted per second from the data processing device to the pen display.

3. The handwriting data processing method as claimed in claim 1, wherein after the pen display receives the captured handwriting data, the pen display further checks correctness of the captured handwriting data.

4. A handwriting processing system, comprising:
a pen display comprising a display module, a transducer, a first wireless communication module and a first processing module being electrically connected with the display module, the transducer and the first wireless communication module, the transducer detecting and further generating a transformed handwriting data;

a data processing device comprising a second processing module and a second wireless communication module being electrically connected with the second processing module, the second wireless communication module being wirelessly coupled to the first wireless communication module;

wherein the data processing device obtains the transformed handwriting data by the second wireless communication module; after the data processing device receives the transformed handwriting data, the data processing device generates a compressed screen image and captures a part of handwriting image of the transformed handwriting data to form a captured handwriting data; the data processing device further transmits the compressed screen image and the captured handwriting data which is not compressed to the pen display by the second wireless communication module; the first processing module uncompresses the compressed screen image and overlaps the uncompressed screen image and the captured handwriting data which is not compressed to form a complete screen image; the display module displays the complete screen image.

5. The handwriting processing system as claimed in claim 4, further comprising a stylus, when the stylus contacts the display module of the pen display, the transducer detects and further generates the transformed handwriting data.

6. The handwriting processing system as claimed in claim 4, the pen display transmits the complete screen image by an image signal conversion scaler to the display module to display the complete screen image.

* * * * *